(12) United States Patent
Mack-Crane et al.

(10) Patent No.: US 8,315,260 B2
(45) Date of Patent: *Nov. 20, 2012

(54) TRANSPORT MULTIPLEXER-MECHANISMS TO FORCE ETHERNET TRAFFIC FROM ONE DOMAIN TO BE SWITCHED IN A DIFFERENT (EXTERNAL) DOMAIN

(75) Inventors: T. Benjamin Mack-Crane, Downers Grove, IL (US); Linda Dunbar, Plano, TX (US); Robert Sultan, Somers, NY (US); Lucy Yong, McKinney, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/252,612

(22) Filed: Oct. 4, 2011

(65) Prior Publication Data

US 2012/0027014 A1 Feb. 2, 2012

Related U.S. Application Data

(63) Continuation of application No. 12/714,928, filed on Mar. 1, 2010.

(60) Provisional application No. 61/158,261, filed on Mar. 6, 2009.

(51) Int. Cl.
*H04L 12/28* (2006.01)

(52) U.S. Cl. ........................................ 370/392; 370/400

(58) Field of Classification Search .................. 370/254, 370/389, 392, 395.53, 401
See application file for complete search history.

(56) References Cited

U.S. PATENT DOCUMENTS

| | | | |
|---|---|---|---|
| 6,035,405 A | 3/2000 | Gage et al. | |
| 6,754,211 B1 * | 6/2004 | Brown | 370/389 |
| 7,586,915 B1 * | 9/2009 | Indiresan et al. | 370/392 |
| 7,802,000 B1 * | 9/2010 | Huang et al. | 709/228 |
| 7,965,709 B2 | 6/2011 | Du | |
| 2003/0130832 A1 | 7/2003 | Schulter et al. | |
| 2007/0071011 A1 | 3/2007 | De Heer et al. | |
| 2008/0002736 A1 | 1/2008 | Droux et al. | |
| 2008/0198857 A1 | 8/2008 | Kim et al. | |
| 2008/0205409 A1 | 8/2008 | McGee et al. | |
| 2009/0059914 A1 | 3/2009 | Khalid et al. | |

(Continued)

FOREIGN PATENT DOCUMENTS

CN 1677950 A 10/2005

(Continued)

OTHER PUBLICATIONS

"Draft Standard for Local and Metropolitan Area Networks—Virtual Bridged Local Area Network-Amendment: Provider Bridging—Remote Customer Service Interface," IEEE P802.1Qbc/D1.1, Feb. 25, 2010.

(Continued)

*Primary Examiner* — Jung Park (57) ABSTRACT

A network comprising a switch configured to switch traffic between a plurality of external interfaces via a plurality of virtual interfaces associated with the external interfaces, and wherein the traffic comprises a plurality of external virtual local area network (VLAN) identifiers (VIDs) associated with the external interfaces to select the virtual interfaces. Also disclosed is a network component comprising at least one processor configured to implement a method comprising receiving a frame from a physical port, obtaining an external VID from a VLAN tag in the frame, removing the VLAN tag from the frame, selecting a virtual interface based on the external VID, and delivering the frame to the selected virtual interface.

20 Claims, 8 Drawing Sheets

U.S. PATENT DOCUMENTS

| | | |
|---|---|---|
| 2009/0304007 A1 | 12/2009 | Tanaka et al. |
| 2011/0032843 A1 | 2/2011 | Papp et al. |

FOREIGN PATENT DOCUMENTS

| | | |
|---|---|---|
| CN | 101160832 A | 4/2008 |
| EP | 1551130 A1 | 7/2005 |
| WO | 0217571 A1 | 2/2002 |
| WO | 2005018174 A1 | 2/2005 |

OTHER PUBLICATIONS

"IEEE Standard for Local and Metropolitan Area Networks—Virtual Bridged Local Area Networks,"—IEEE Std. 802.1QTM-2005, May 19, 2006.

Foreign Communication From a Related Counterpart Application, European Application 10748349.7, Extended European Search Report, Sep. 7, 2011, 19 pages.

Foreign Communication From a Related Counterpart Application, PCT Application PCT/CN2010/070906, International Search Report, Jun. 17, 2010, 4 pages.

Foreign Communication From a Related Counterpart Application, PCT Application PCT/CN2010/070906, Written Opinion, Jun. 17, 2010, 10 pages.

Foreign Communication From the Parent Application, U.S. Appl. No. 12/714,928, Pre-Interview Communication for First Action Interview Pilot Program, Dec. 14, 2011, 6 pages.

First office action of corresponding U.S. Appl. No. 12/714,928, mailed on Dec. 14, 2011, 6 pages total.

First office action of corresponding European Patent Application No. 10748349.7, mailed on May 18, 2012, 6 pages total.

\* cited by examiner

TRANSPORT MULTIPLEXER-MECHANISMS TO FORCE ETHERNET TRAFFIC FROM ONE DOMAIN TO BE SWITCHED IN A DIFFERENT (EXTERNAL) DOMAIN

CROSS-REFERENCE TO RELATED APPLICATIONS

The present application is a continuation of U.S. patent application Ser. No. 12/714,928, filed Mar. 1, 2010 by Linda Dunbar, et al. and entitled "Transport Multiplexer—Mechanisms to Force Ethernet Traffic from One Domain to Be Switched in a Different (External) Domain," which claims priority to U.S. Provisional Patent Application No. 61/158,261 filed Mar. 6, 2009 by Linda Dunbar, et al. and entitled "Transport Multiplexer—Mechanisms to Force Ethernet Traffic from One Domain to Be Switched in a Different (External) Domain," both of which are incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks, such as Ethernet based networks, are comprised of nodes that transport data through the network. The nodes may include routers, switches, and/or bridges that transport the individual data frames or packets through the network. For example, the Institute of Electrical and Electronics Engineers (IEEE) 802.1Q compliant Ethernet switches forward data frames based on their learned or provisioned filtering database (FDB). As such, the frames can be forwarded based on an associated destination address (DA) and a virtual local area network (VLAN) identifier (VID). If the FDB does not comprise an entry that matches an incoming frame's DA and VID, the frame can be flooded to all the ports except the one on which the frame arrived. Accordingly, the data frames can be forwarded between the nodes in a single network (or domain) or in different networks (or domains).

SUMMARY

In one embodiment, the disclosure includes a network comprising a switch configured to switch traffic between a plurality of remote interfaces via a plurality of virtual interfaces associated with the remote interfaces, wherein the traffic comprises a plurality of external VIDs associated with the remote interfaces to select the virtual interfaces.

In another embodiment, the disclosure includes a switch comprising a transport multiplexer configured to multiplex traffic between a plurality of remote interfaces via a plurality of virtual interfaces associated with the remote interfaces, wherein the traffic comprises a plurality of external VIDs associated with the remote interfaces to select the virtual interfaces.

In another embodiment, the disclosure includes a network component comprising at least one processor configured to implement a method comprising receiving a frame at a physical port, obtaining an external VID from a VLAN tag in the frame, removing the VLAN tag from the frame, selecting a virtual interface based on the external VID, and delivering the frame to the selected virtual interface.

In yet another embodiment, the disclosure includes a method comprising selecting at a physical port a virtual interface to send a frame, adding to the frame a VLAN tag comprising an external VID that identifies the virtual interface, and sending the frame on a physical port coupled to the virtual interface.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

When different networks or network domains communicate with each other, packets may be switched locally within each network or domain. The packets may be routed between different nodes or interfaces within each network or domain using VIDs, which may be assigned and/or maintained by local (internal) switches. However, when a second (external) network provides external services to some of the interfaces attached to a first network, it may be desirable to provide the second network control over packet forwarding, e.g. switching capability, between those interfaces attached to the first network. Typically, to achieve external switching the second network may establish a plurality of physical circuit connections to the remote interfaces in the first network, and thus route the packets (externally) between those interfaces. However, establishing and managing a plurality of physical circuit connections may be demanding in terms of allocated resources, complexity, and cost.

Disclosed herein are systems and methods for switching a plurality of packets associated with a plurality of interfaces in a first network by a second network, which may provide external services to the interfaces in the first network. Accordingly, the second network may have some control over the interfaces' traffic, such as enforcing policies for traffic forwarding and quality of service (QoS). The packets associated with the interfaces in the first network may be externally switched by the second network based on a plurality of configured virtual ports, which may be associated with the interfaces in the first network. The traffic may be first received by a physical port and a first virtual interface or port may be selected based on an external VID, e.g. in a VLAN tag, in the traffic. The VLAN tag containing the external VID may then be removed and the traffic may then be assigned an internal VID to deliver the traffic to the first virtual interface and other interfaces or ports. The traffic may then be forwarded to a second virtual interface or port that corresponds to the internal VID if the DA of the traffic is found (e.g. in the FDB) or to a plurality of second virtual interfaces or ports if the DA is not found. A second external VID may be added, e.g. using a VLAN tag, to the traffic and the traffic may then be sent back to the first network. The internal VID may be assigned to the traffic independent of the external VID and the second external VID. The internal VID may be a default VID indicated by the virtual interface or port or may be obtained from a second VLAN tag in the traffic. As such, the external VIDs associated with the virtual interfaces may be used to select the virtual interfaces or ports and the internal VID may be used to forward the packets at the virtual interfaces or ports or at other physical interfaces. Additionally, the traffic may not be forwarded back to a source interface that originated the traffic in the first network. The virtual interfaces or ports may be established on a physical port, which may receive and send back traffic via the same physical connection or interface.

Figure 1:
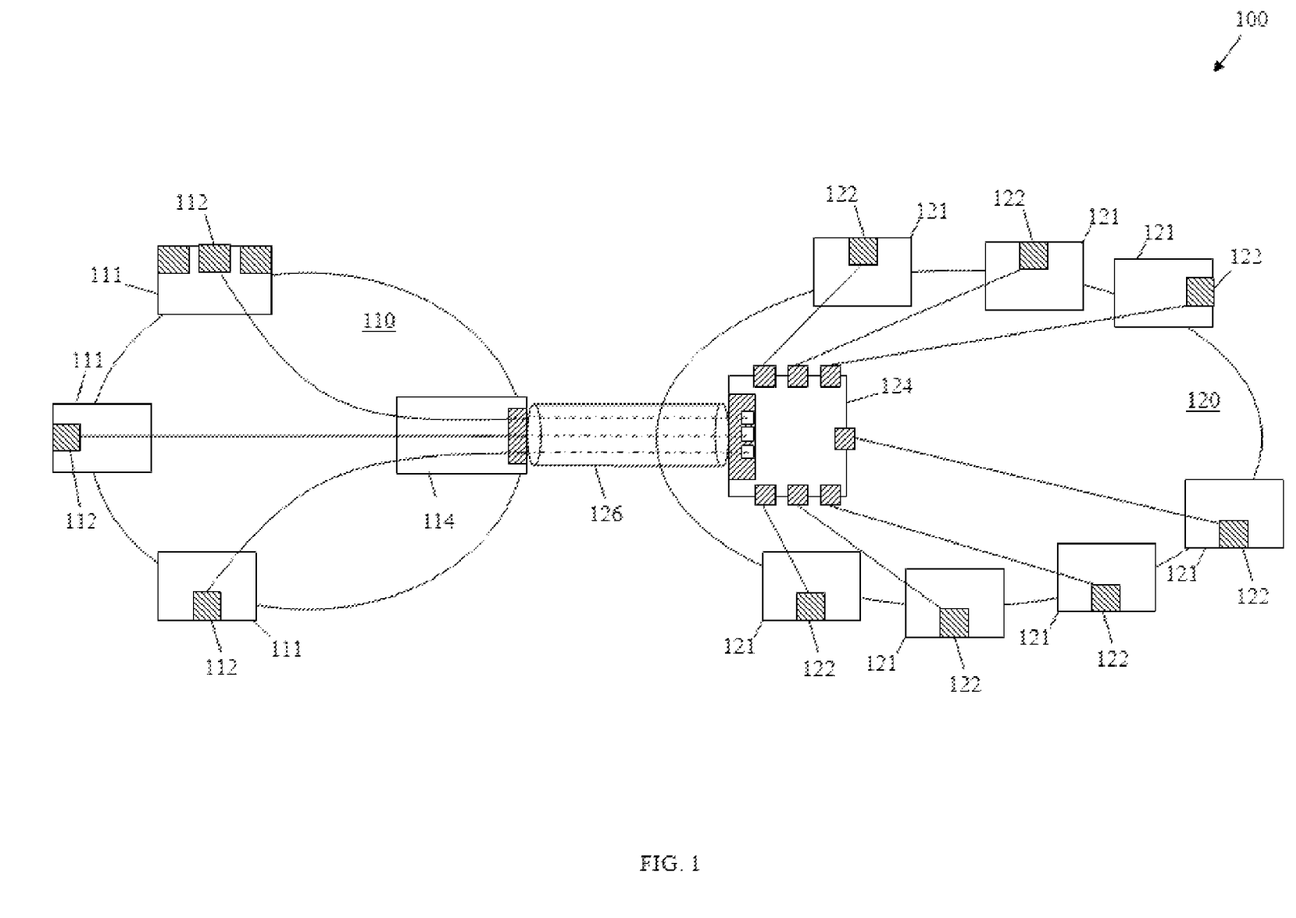
FIG. 1 is a schematic diagram of an embodiment of a communication system.

FIG. 1 illustrates an embodiment of a communication system 100 that comprises two service provider networks. The communication system 100 may comprise a first service provider network 110 and a second service provider network 120, which may be coupled to the first service provider network 110. The first service provider network 110 may have a plurality of first nodes 111, which may comprise a plurality of first interfaces 112 and a first switch 114. The second service provider network 120 may comprise a plurality of second nodes 121, which may comprise a plurality of second interfaces 122, and a second switch 124, which may be coupled to the first switch 114 via a network-to-network interface (NNI) 126. For instance, each first node 111 may comprise at least one first interface 112 and each second node 121 may comprise at least one second interface 122.

The first service provider network 110 and the second service provider network 120 may each provide services to a plurality of clients, and may control and manage at least some of the traffic associated with the services. For example, the first service provider network 110, and similarly the second network provider 120, may switch the traffic comprising its services from/to the clients and provision policies for delivering the services. The services may comprise data, voice, video, other services, or combination thereof. The services may be real-time services and/or on demand services, and may be delivered to the clients using the same or different technologies.

In an embodiment, the first service provider network 110 and the second service provider network 120 may be any network within which a plurality of data packets may be transported between the first interfaces 112, the second interfaces 122, or both. For instance, the first service provider network 110 may be an Ethernet based network configured to transfer Ethernet frames or packets between the first interfaces 112 and the second service provider network 120. The second service provider network 120 may be configured to transport a plurality of packets between the second interfaces 122 and between the first interfaces 112 and the second interfaces 122, e.g. via the NNI 126. However, direct packet transfer or switching may not be allowed between the first interfaces 112 in the first service provider network 110. Instead, the second service provider network 120 may be configured to receive and switch Ethernet frames between the first interfaces 112 in the first service provider network 112 using the second switch 124, as described in detail below. In some embodiments, the first service provider network 110, and similarly the second service provider network 120, may run any one of a variety of protocols, such as Ethernet, Internet Protocol (IP), Multiprotocol Label Switching (MPLS), Asynchronous Transfer Mode (ATM), or Frame-Relay, among others.

The first interfaces 112 and the second interfaces 122 may reside on any devices that transport data, e.g. in the form of packets, between one another other. The first interfaces 112 may exchange data between each other and with the second interfaces 122 in the second service provider network 120 via the first switch 114, the NNI 126, and the second switch 124. The first interfaces 112 and the second interfaces 122 may reside on bridges or switches. Such devices typically contain a plurality of ingress ports for receiving packets from other nodes, logic circuitry to determine which egress ports to send the packets to, and a plurality of egress ports for transmitting packets to other nodes. The first interfaces 112 and the second interfaces 122 may comprise source ports and/or destination ports, which may produce and/or receive data streams. In an embodiment, the first interfaces 112, and similarly the second interfaces 122, may reside on edge nodes, e.g. Provider Edge Bridges (PEBs) or Backbone Edge Bridges (BEBs). In another embodiment, the first interfaces 112 and the second interfaces 122 may comprise user network interfaces (UNIs). For instance, any of the first interfaces 112 and the second interfaces 122 may be coupled to user-oriented devices, such as desktop computers, notebook computers, personal digital assistants (PDAs), or other communication devices.

The first switch 114 may be configured to forward packets between the first service provider network 110 and the second service provider network 120, via the NNI 126. In an embodiment, the first switch 114 may not switch or route traffic between the first interfaces 112, but instead send packets intended to be exchanged between the first interfaces 112 through the second switch 124 in the second network 120. The first switch 114 may switch the packets between the first interfaces 112 and the second switch 124 based the DAs and/or VIDs in the packets, e.g. using a FDB.

The second network 120 may be configured to switch packets comprising services between the second interfaces 122. The second switch 124 may be a bridge that comprises a transport multiplexer configured to enable external switching of the traffic in the first service provider network 110 by the second service provider network 120. For instance, the second switch 124 may be configured to switch packets that comprise services provided by the second network 120 to the first interfaces 112 in the first service provider network 110. The second switch 124 may use the VID (e.g. external VID) from a VLAN tag in the packets received from the first service provider network 110 to identify and select a virtual interface, which may be a virtual port or a pair of virtual ports connected internally to the switch. The second switch 124 may remove the VLAN tags carrying the external VIDs and assign an internal VID to the packets independently from the external VID and forward the packets to a second interface, such as a second virtual interface, based on the internal VIDs and/or DAs in the packets, e.g. using a FDB. The second virtual interface may then add a second VLAN tag (e.g. carrying a second external VID) to the packets that identifies the second virtual interface and send back the packets to the first service provider network 110. As such, the second switch 124 may receive traffic from the first service provider network 110, which may comprise a plurality of VIDs associated with the first interfaces 112, and may use the VIDs to identify and select the virtual interfaces or ports associated with the first interfaces 112. Packets forwarded from one virtual interface or port to another belonging to the same internal VLAN may be received and subsequently transmitted on the same NNI with different VIDs identifying different reception and transmission virtual interfaces or ports. The packets from the first service provider network 110 may be received by the second switch 124 via the NNI 126, and hence routed back to their destination among the first interfaces 112 based on the VIDs.

Additionally, the second switch 124 may be configured to forward packets between the second service provider network 120 and the first service provider network 110, via the NNI 126. For instance, the second switch 124 may receive packets from a second interface 122, assign an internal VID to the packets, and send the packets to a virtual interface. The second switch 124 may add a VLAN tag comprising a VID identifying the virtual interface (e.g. external VID) that is independent from the internal VID and then forward the packet to the first service provider network 110. Alternatively, the second switch 124 may receive packets from a first interface 112, remove a VLAN tag comprising a VID (e.g. external VID) from the packets, and use the VID to select a virtual interface or port. The second switch 124 may assign an internal VID to the packets and then send the packets to any of the second interfaces 122.

In an embodiment, the NNI 126 may comprise a plurality of virtual or logical connections, which may be established between the second switch 124 and the first switch 114. Each virtual connection may be associated with at least one of the first interfaces 112 in the first service provider network 110. The virtual connections of the NNI 126 may correspond to the first interfaces 112 (e.g., via the first switch 114) and may be associated with a plurality of virtual interfaces at the transport multiplexer of the second switch 124.

In a specific embodiment, the first service provider network 110 may be a first provider bridged network (PBN), the second service provider network 120 may be a second PBN, and the second switch 124 may comprise an aggregated port, which may be a remote customer access port, and a transport multiplexer, which may be a port-mapping service VLAN (S-VLAN) component. The port-mapping S-VLAN component may establish a plurality of virtual interfaces, which may be remote customer service interfaces (RCSIs) associated with the first interfaces 112. The RCSI may be a virtual interface that comprises a provider access port and a customer network port or a customer edge port, which may be coupled to each other via an internal LAN. At the second switch 124, the remote customer access port may receive a packet from one of the first interfaces 112, obtain the external VID from the packet, and select the RCSI or the provider access port based on the external VID. The packet may then be sent (e.g. without the external VID VLAN tag) to the customer network port of the RCSI, which may assign the internal VID to the packet. Hence, the packet may be forwarded from the customer network port to another first interface 112 (e.g. via another RCSI) or to a second interface 122, as described above.

Typically, to externally switch the traffic associated with the first interfaces 112, a distinct VID may be assigned in the first service provider network 110 for each of the first interfaces 112. The assigned VIDs may prevent the associated traffic from being switched between the first interfaces 112 within the first service provider network 110. As such, the traffic may not be routed between the first interfaces 112 using a switch in the provider network 110 (e.g. the first switch 114). Instead, the traffic may be forwarded from the first interfaces 112 to the second service provider network 120 for external switching (e.g. by the second switch 124), and then forwarded back to the first interfaces 112. For example, a plurality of first interfaces 112 (C1, C2, and C3) may be assigned a plurality of distinct VIDs (b1, b2, and b3, respectively) to enable external switching. The first switch 114 may forward traffic associated with the VIDs b1, b2, and b3 between any of the first interfaces 112 and the second service provider network 120 but not directly between the first interfaces 112 in the first service provider network 110. The traffic may be forwarded to/from the second service provider network 120 via the NNI 126 and may be separated in the NNI 126 using the different VIDs b1, b2, and b3.

To enable multicasting packets in the routing scheme above, the second service provider network 120 may require a hairpin feature. The hairpin feature may enable the second switch 124 to received and send traffic over the same connection with the first service provider network 110, e.g. via the NNI 126. The hairpin feature may not be compatible with the IEEE 802.1Q, where receiving and sending the packets via the same physical port may not be allowed. However, some current switches (e.g. switching chips) may support the hairpin feature. Further, the routing scheme may require VID translation capability, e.g. at the second switch 124, that converts the VID associated with the any of the first interfaces 112 (e.g. VIDs b1, b2, or b3) into a new internal VID associated with all first interfaces 112. The internal VID may allow switching back the traffic to the first service provider network 110 in addition to forwarding the traffic within the second service provider network 120.

In an embodiment, to achieve external switching, the second switch 124 may be configured to receive at a first virtual interface or port the packets from a source interface in the first service provider network 110 and forward back the packets at a second virtual interface or port to a destination interface in the first service provider network 110. The first virtual interface or port may be selected by an external VID in the packets at the second switch 124, which identifies or defines the first virtual port. The first virtual port may be selected based on an external VID in the received packets, which may be assigned at the first service provider network 110. The VLAN tag containing the external VID may be removed before the packet is delivered to the first virtual port. An internal VID may be assigned to all packets delivered via the first virtual port. In the case of a VLAN differentiable switching scheme, the internal VID may be obtained from a second VLAN tag in the packets, which may be exposed after removing the external VID VLAN tag, or the internal VID assigned to the packets may be a default VID associated with the first virtual interface or port. Alternatively, in the case of a VLAN blind switching scheme, the packets may not comprise a second VLAN tag and may not have an associated internal VID.

Figure 2:
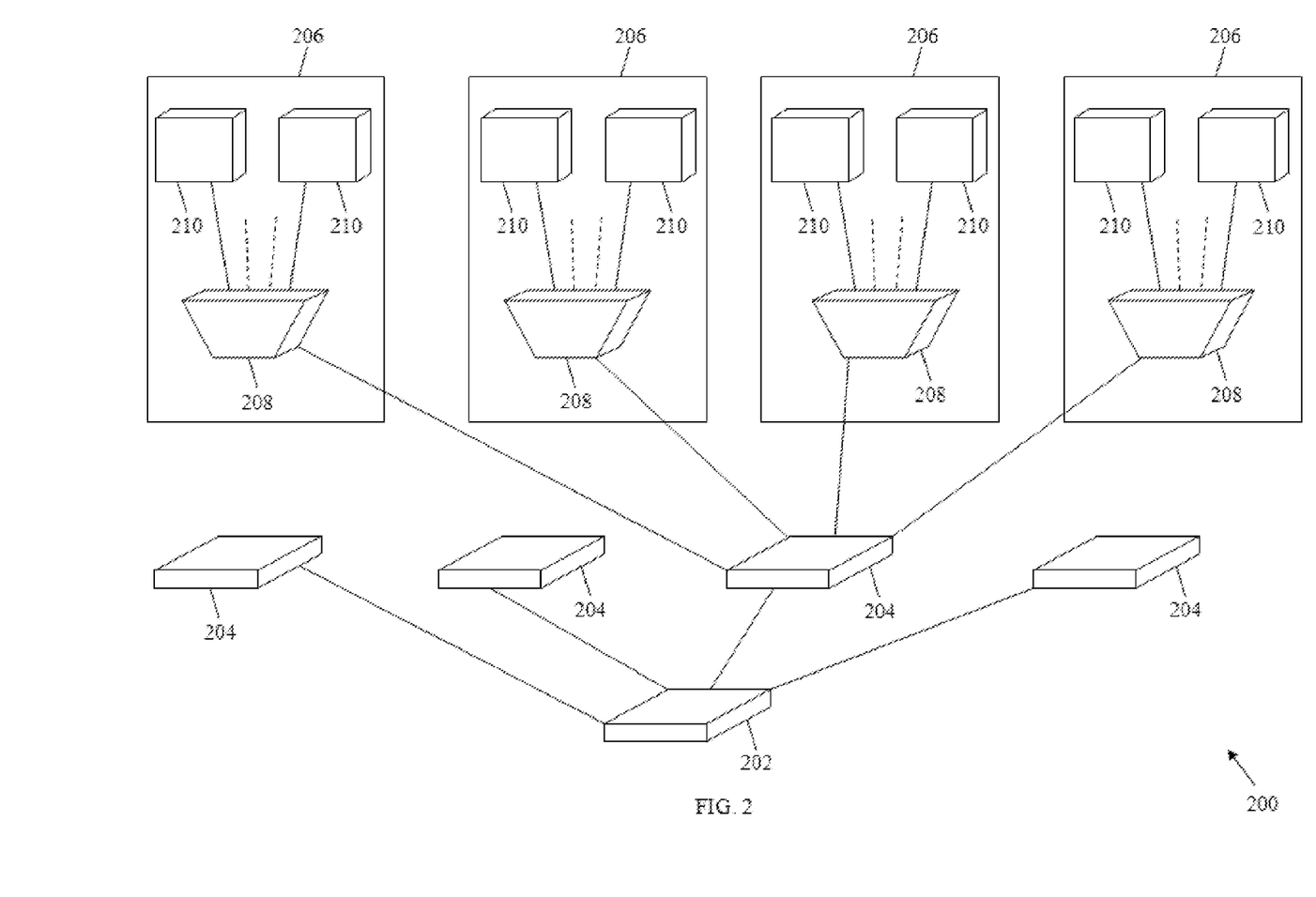
FIG. 2 is a schematic diagram of an embodiment of a networking system.

FIG. 2 illustrates an embodiment of a networking system 200, which may connect a plurality of virtual machines (VMs), e.g. in a server environment. The networking system 200 may comprise a core bridge 202, a plurality of transport-multiplexer-aware (TM-aware) bridges 204 that may be coupled to the core bridge 202, and a plurality of servers 206 that may be coupled to any of the TM-aware bridges 204. Each server 206 may comprise a transport multiplexer 208 (e.g. a port-mapping S-VLAN component on a server platform) and a plurality of VMs 210. The core bridge 202 may be a bridge located in a core network, such as an Ethernet based network, and may communicate with the VMs 210 via the transport multiplexers 208 and the TM-aware bridges 204. The TM-aware bridges 204 may also comprise a plurality of transport multiplexers (or port-mapping S-VLAN components) that match the transport multiplexers (or port-mapping S-VLAN components) 208. The servers 206 may comprise network interface cards (NICs), which may each be coupled to a plurality of VMs 210. A VM 210 may be any process implemented on a server, such as an operating system (OS) instance or a general computing process. Alternatively, the VM 210 may be a packet related process such as a virtual bridge or a virtual Ethernet port aggregator (VEPA), or may be a software program on a NIC.

The VMs 210 may be configured to communicate with a plurality of network terminals (e.g. computer terminals, storage devices, and the like) or other VMs. The transport multiplexer 208 may be paired with a transport multiplexer in the TM-aware bridge 204 to provide channels connecting pairs of virtual interfaces. Each virtual interface on a transport multiplexer 208 attached to a VM may have a corresponding virtual interface in the TM-aware bridge 204. The TM-aware bridge 204 may forward data, e.g. Ethernet frames or packets, between virtual interfaces on the same transport multiplexer and thus between VMs 210 in the same server 206. Additionally, the TM-aware bridge 204 may comprise a transport-multiplexer or port-mapping S-VLAN component, which may be used to forward traffic between the transport multiplexers 208 and the core bridge 202. For VM-to-VM data exchange, which may require advanced bridging services, the data may be forwarded between the VMs 210 in the same server 206 externally by the TM-aware bridge 204 and the transport multiplexer 208 coupled to the VMs 210. As such, the transport multiplexers 208 may switch data or frames between the VMs 210 and the TM-aware bridge 204. Using the transport multiplexers 208 and TM-aware bridges 204 to switch data externally between the different VMs 210 may be advantageous since no additional or extra switching or filtering capabilities may be needed in the servers 206 or the VMs 210. Similar to the second switch 124, the TM-aware bridge 204 may be configured to receive data from source VMs 210, use a VLAN tag added by the transport multiplexer 208 to select a virtual interface or port using an external VID, switch the data, and send back the data via a second virtual interface or port to a destination VM 210, adding a VLAN tag containing an external VID identifying the second virtual interface or port. The TM-aware bridge 204 may also prevent packet return to sender in the case of packet multicasting. Returning multicast packets to sender may be prevented by forwarding the packets from the transport multiplexer 208 using a plurality of virtual ports, as described in detail below.

Figure 3:
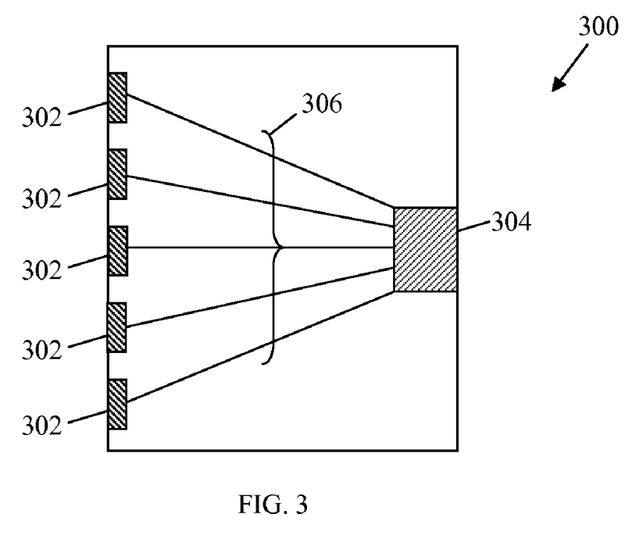
FIG. 3 is a schematic diagram of an embodiment of a switch component.

FIG. 3 illustrates an embodiment of a switch component 300, which may be used for external switching in the communication system 100 or the networking system 200. For instance, the switch component 300 may be a component of the second switch 124 that comprises or establishes the virtual interfaces or ports or the transport multiplexer 208 within a server 206 or a component of the TM-aware bridge 204. The switch component 300 may comprise a plurality of leaf ports 302 on one end and an aggregated port 304 on an opposite end. The leaf ports 302 may be associated with a plurality of interfaces for which traffic may be switched by an external switch. For instance, in the case of the second switch 124 scheme, the leaf ports 302 may be associated with the different first interfaces 112. In the case of the transport multiplexer 208, the leaf ports 302 may be attached to the different VMs 210. In the case of the TM-aware bridge 204 the leaf ports 302 may be associated with leaf ports 302 on the transport multiplexer 208 and thus to the different VMs 210 to which these are attached. The aggregated port 304 may be associated with the leaf ports 302 using a plurality of VIDs in the received/forwarded packets at the aggregated port 304.

In an embodiment, the switch component 300 may be configured to switch frames or packets that may be untagged and have no assigned internal VID at the leaf ports 302, such as frames from a VM 210 in a server 206 in the networking system 200. The switch component 300 may establish the leaf ports 302, which may be virtual ports, on a physical port 304 by assigning an external VID associated with each leaf port 302 and adding a VLAN tag containing the associated external VID to the frames or packets received on a leaf port 302 and sent on the aggregated port 304. Such switching scheme may be referred to as VLAN blind (or non-differentiable) switching. Alternatively, the switch component 300 may be configured to switch frames or packets that may have assigned internal VIDs, which may be encapsulated in VLAN tags in the frames. The internal VIDs may be independent from the external VIDs in the frames, e.g. in different VLAN tags, which may be used to select the leaf ports 302. As such, the switch component 300 may establish the leaf ports 302 by assigning the external VIDs to the packets or frames. Such switching scheme may be referred to as VLAN differentiable switching.

Figure 4:
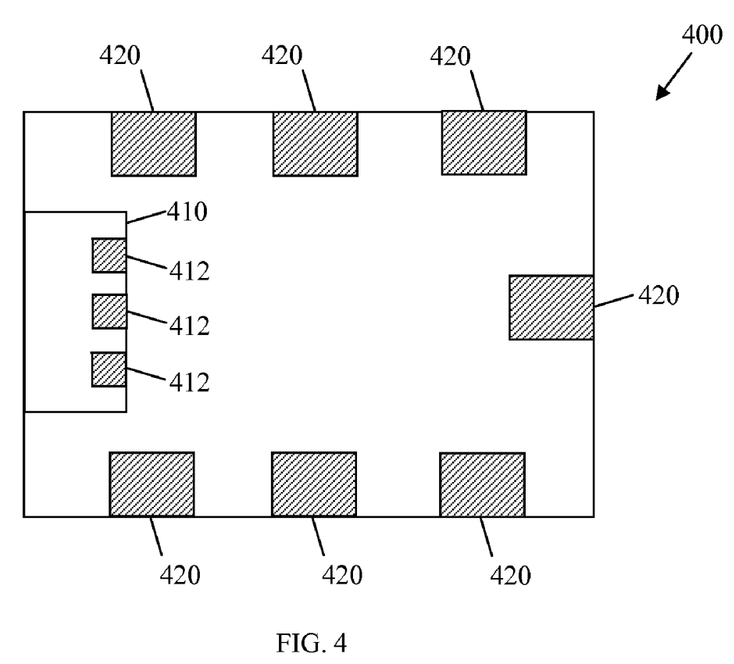
FIG. 4 is a schematic diagram of another embodiment of a switch architecture.

FIG. 4 illustrates an embodiment of a switch architecture 400, which may be used for switching traffic in a first network by a second (external) network. The switch architecture 400 may correspond to the second switch 124 in the communication system 100 or to the TM-aware bridge 204 in the networking system 200. The switch architecture 400 may switch traffic in the second network, which may be received from a plurality of interfaces in the first network or a plurality of VMs in a server. Thus, the second network may have control over traffic forwarding between the interfaces in the first network or server, such as setting policies and ensuring QoS requirements for traffic forwarding. The switch architecture 400 may also be used to forward traffic between the first network or server and the second network.

The switch architecture 400 may comprise a first port 410 and a plurality of second ports 420. The first port 410 may be connected to the first network and may comprise a plurality of virtual or logical ports 412, which may be coupled to the second ports 420. For example, the first port 410 may be coupled to a switch in the first network, as in the case of the second switch 124. The second ports 420 may be connected to a plurality of nodes in the second network. Thus, data may be forwarded between the first network and the second network via the virtual ports 412 and the second ports 420. Alternatively, the first port 410 may be coupled to a server platform that comprises a plurality of VMs, such as a server 206, and the second port 420 may be coupled to a core bridge.

The virtual ports 412 may be associated with the interfaces in the first network. For instance, one of the virtual ports 412 may be selected to receive traffic from a source interface in the first network, e.g. based on an external VID VLAN tag that may be removed, and the traffic may be switched to a destination interface, e.g. in the first network via another virtual port 412 or via a second port 420. The virtual ports 412 may prevent frames from being returned to a source interface, e.g. in compliance with IEEE 802.1Q for Ethernet compliant switches. Accordingly, the virtual ports 412 may allow frames to be received and forwarded over the same physical interface or port (e.g. NNI) by may not return the frames back via the same virtual port 412 to the source interface. For instance, when a first virtual port 412 receives multicast packets from a source interface in the first network, the packets may be forwarded (multicast) via other virtual ports 412 to other interfaces in the first network except the source interface associated with the first virtual port 412. A virtual port 412 may also receive traffic from a second port 420, add a VLAN tag that comprises an external VID to the traffic, and send the traffic to the first network.

Figure 5:
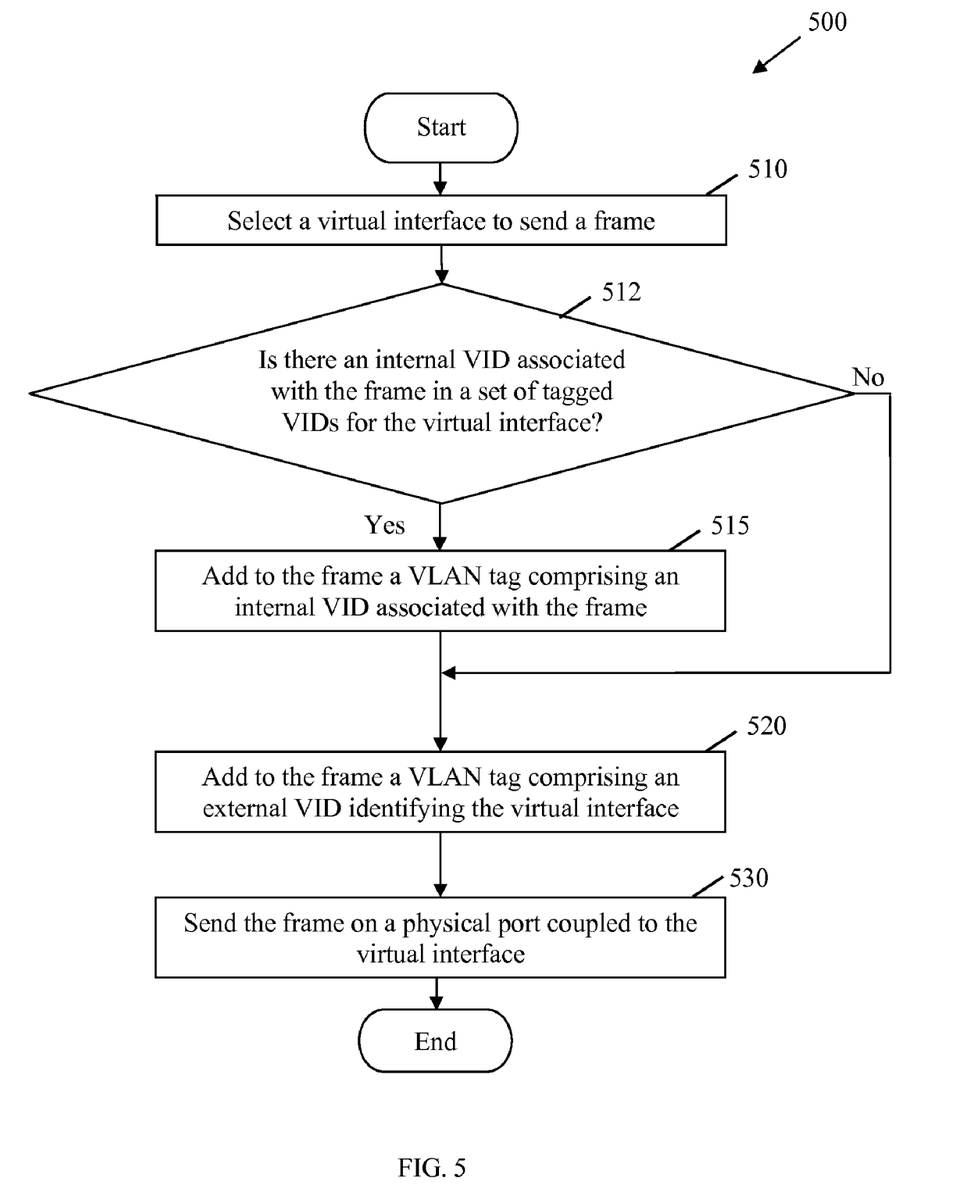
FIG. 5 is a flowchart of an embodiment of a VLAN differentiable transport multiplexing method for transmitting a frame.

FIG. 5 illustrates an embodiment of a VLAN differentiable transport multiplexing method 500 for transmitting a frame. The method 500 may be used to switch packets or frames between a plurality of interfaces in a first network by a second network. For instance, the method 500 may be implemented using the second switch 124 in the communication system 100 or the TM-aware bridge 204 in the networking system 200 and may correspond to the switch architecture 400. The method 500 may begin at block 510, where a virtual interface may be selected to send a frame. For instance, the second switch 124 may determine to send a frame or packet to a virtual port, which may be a virtual port 412 in the switch architecture 400. At block 512, the method 500 may determine whether there is an internal VID associated with the frame in a set of tagged VIDs for the virtual interface. If there is an internal VID in the set of tagged VIDs then the method 500 may proceed to block 515. Otherwise, if the condition in block 512 is not met then the method 500 may proceed to block 520. At block 515, a VLAN tag comprising an internal VID associated with the frame may be added to the frame. However, if the VID is not in the set of tagged VIDs for the virtual interface, no internal VID VLAN tag may be added to the frame.

At block 520, a second VLAN tag comprising an external VID identifying the virtual interface may be added to the frame. The second VLAN tag comprising the external VID may be different from the VLAN tag in the frame comprising an internal VID. For instance, the second VLAN tag may comprise an external VID that indicates one of the virtual ports 412 in the first port 410. At block 530, the frame may be sent on a physical port coupled to the virtual interface. For instance, a frame or packet may be sent to the first port 410, which may be a physical port in the switch architecture 400 and coupled to the virtual port 412 indicated by the external VID in the packet. The method 500 may then end. In an alternative embodiment, a VLAN blind transport multiplexing method may be used for transmitting a frame, for instance using the second switch 124 in the communication system 100 or the TM-aware bridge 204 in the networking system 200. The VLAN blind method may be similar to the method 500 but may not comprise blocks 512 and 515.

Figure 6:
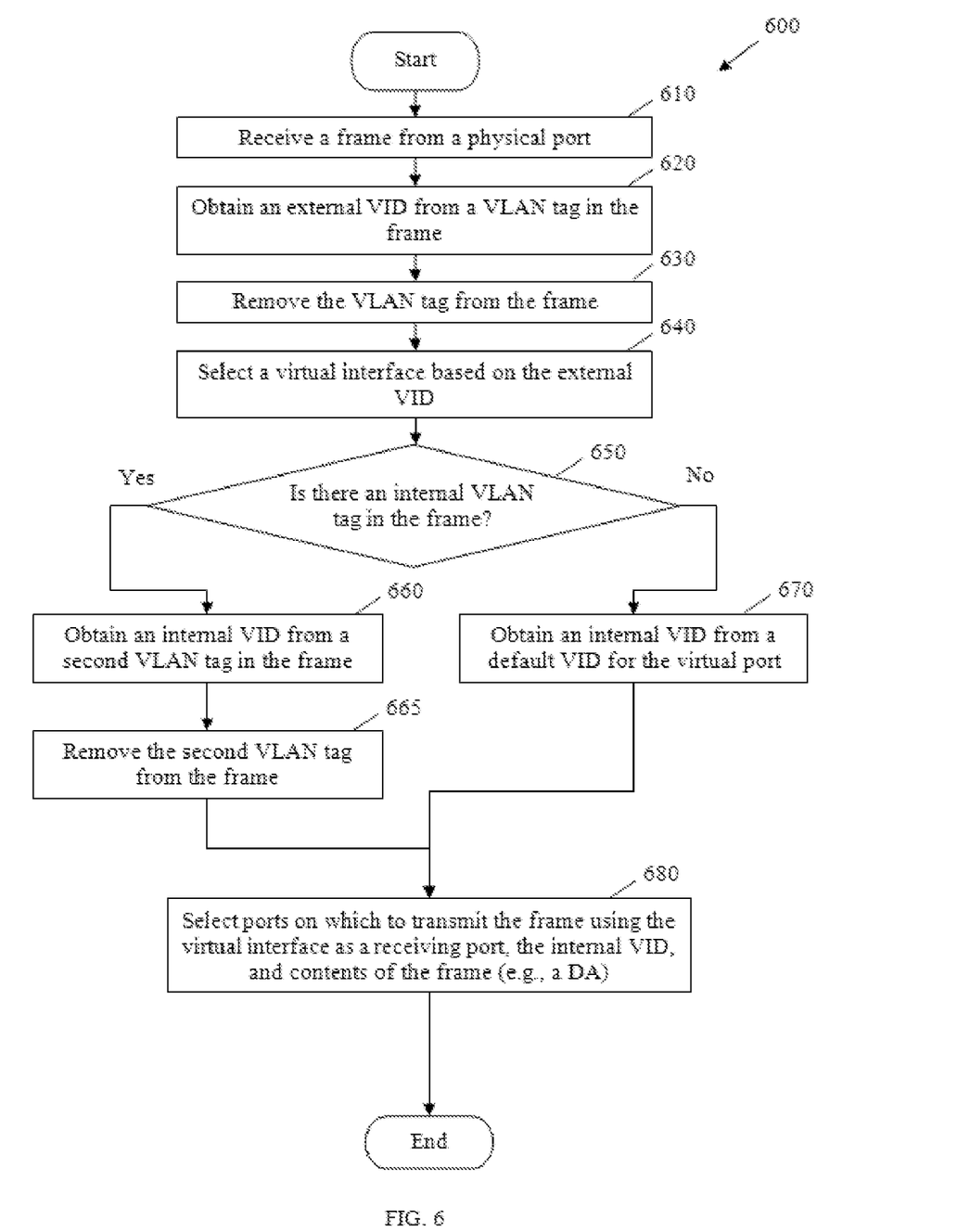
FIG. 6 is a flowchart of another embodiment of a VLAN differentiable transport multiplexing method for receiving a frame.

FIG. 6 illustrates an embodiment of a VLAN differentiable transport multiplexing method 600 for receiving a frame. The method 600 may be used to switch packets or frames between a plurality of interfaces in a first network by a second network, e.g. using the second switch 124 in the communication system 100 or the TM-aware bridge 204 in the networking system 200. The method 600 may begin at block 610, where a frame may be received from a physical port. For instance, the frame may be received from the first port 410 in the switch architecture 400. At block 620, an external VID may be obtained from a VLAN tag in the frame. At block 630, the VLAN tag may be removed from the frame. At block 640, a virtual interface may be selected based on the external VID. For instance, a frame or packet may be received at the first port 410 and a VLAN tag comprising an external VID, which may be used to identify one of the virtual or logical ports 412 in the first port 410, may be extracted from the packet.

At block 650, the method 600 may determine whether there is an internal VID VLAN tag in the frame. If there is an internal VID VLAN tag in the frame then the method 600 may proceed to 660, an internal VID may be obtained from a second VLAN tag in the frame. At block 665, the second VLAN tag may be removed from the frame and the method may then proceed to block 680. Alternatively, at block 670, an internal VID may be obtained from a default VID for the virtual port and the method 600 may then proceed to block 680. At block 680, the method 600 may select ports (or at least one port) on which to transmit the frame using the virtual interface as the receiving port, the internal VID, and contents of the frame (e.g., a DA). In an alternative embodiment, a VLAN blind transport multiplexing method may be used for receiving the frame, for instance using the second switch 124 in the communication system 100 or the TM-aware bridge 204 in the networking system 200. The VLAN blind method may be similar to the method 600 but may not comprise blocks 650, 660, 665, and 670. Further, at block 680, the ports on which to transmit the frame may be selected without an internal VID.

Figure 7:
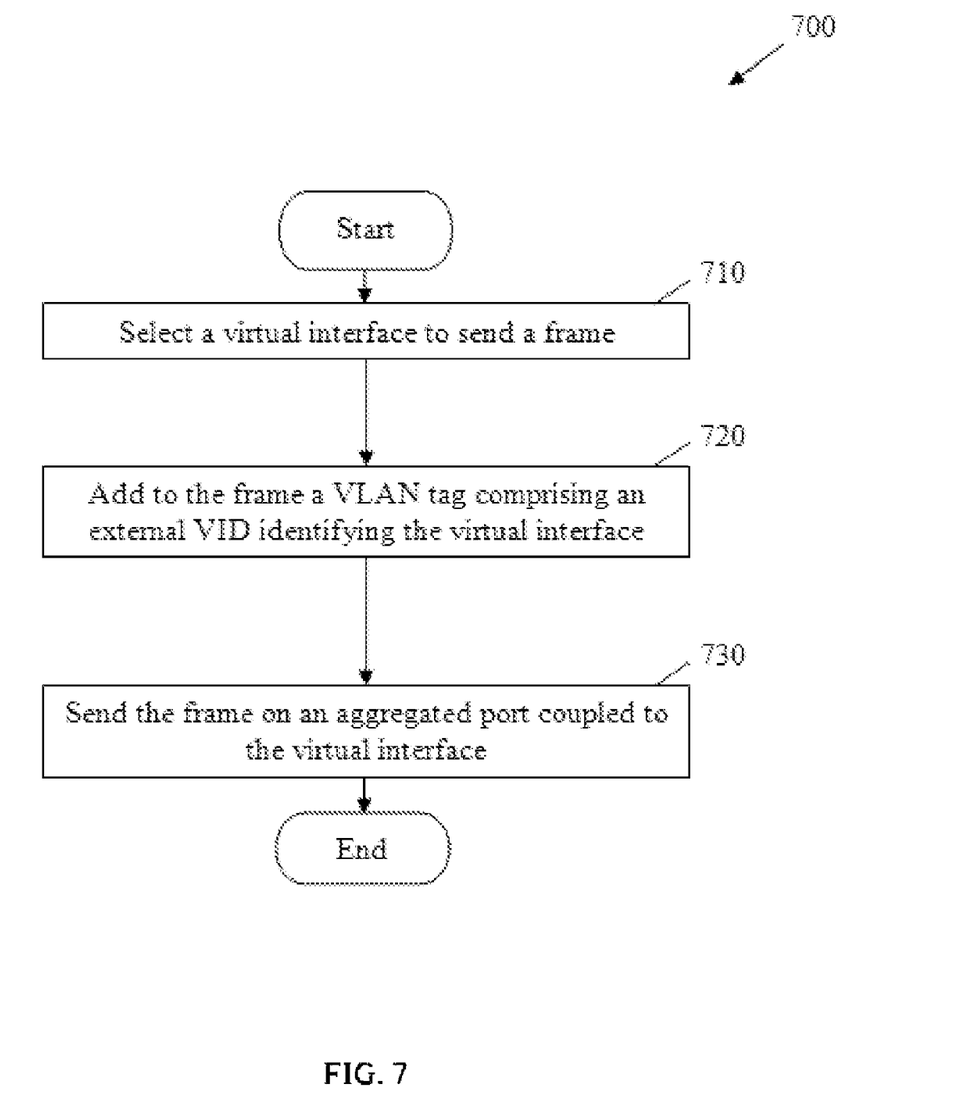
FIG. 7 is a flowchart of another embodiment of a VLAN blind transport multiplexing method for transmitting a frame.

FIG. 7 illustrates an embodiment of a VLAN blind transport multiplexing method 700 for transmitting a frame. The method 700 may be used to multiplex packets or frames in an end system. For instance, the transport multiplexing method 700 may be used to multiplex frames for the VMs 210 by the transport multiplexers 208 in the server 206, which may be implemented using the switch component 300 in the transport multiplexer 208. The method 700 may begin at block 710, where a virtual interface may be selected to send a frame. For instance, a VM 210 may determine to send a frame or packet to a virtual interface, which may be a leaf port 302 in the switch component 300 that is coupled to the VM. In the case of a VLAN blind switching scheme, no internal VID VLAN tag may be added to the frame as part of the transport multiplexing process.

At block 720, a VLAN tag comprising an external VID identifying the virtual interface may be added to the frame. The VLAN tag comprising the external VID may be different from a VLAN tag in the frame comprising an internal VID, e.g. if the frame sent by the VM 210 comprises an internal VID VLAN tag. For instance, at block 720, the VLAN tag added to the frame may comprise an external VID that indicates one of the leaf ports 302 coupled to the aggregated port 304 in the switch component 300. At block 730, the frame may be sent on an aggregated port coupled to the virtual interface. For instance, the frame may be sent to the aggregated port 304 in the switch component 300 that is coupled to the leaf port 302 indicated by the external VID in the frame. The method 700 may then end.

Figure 8:
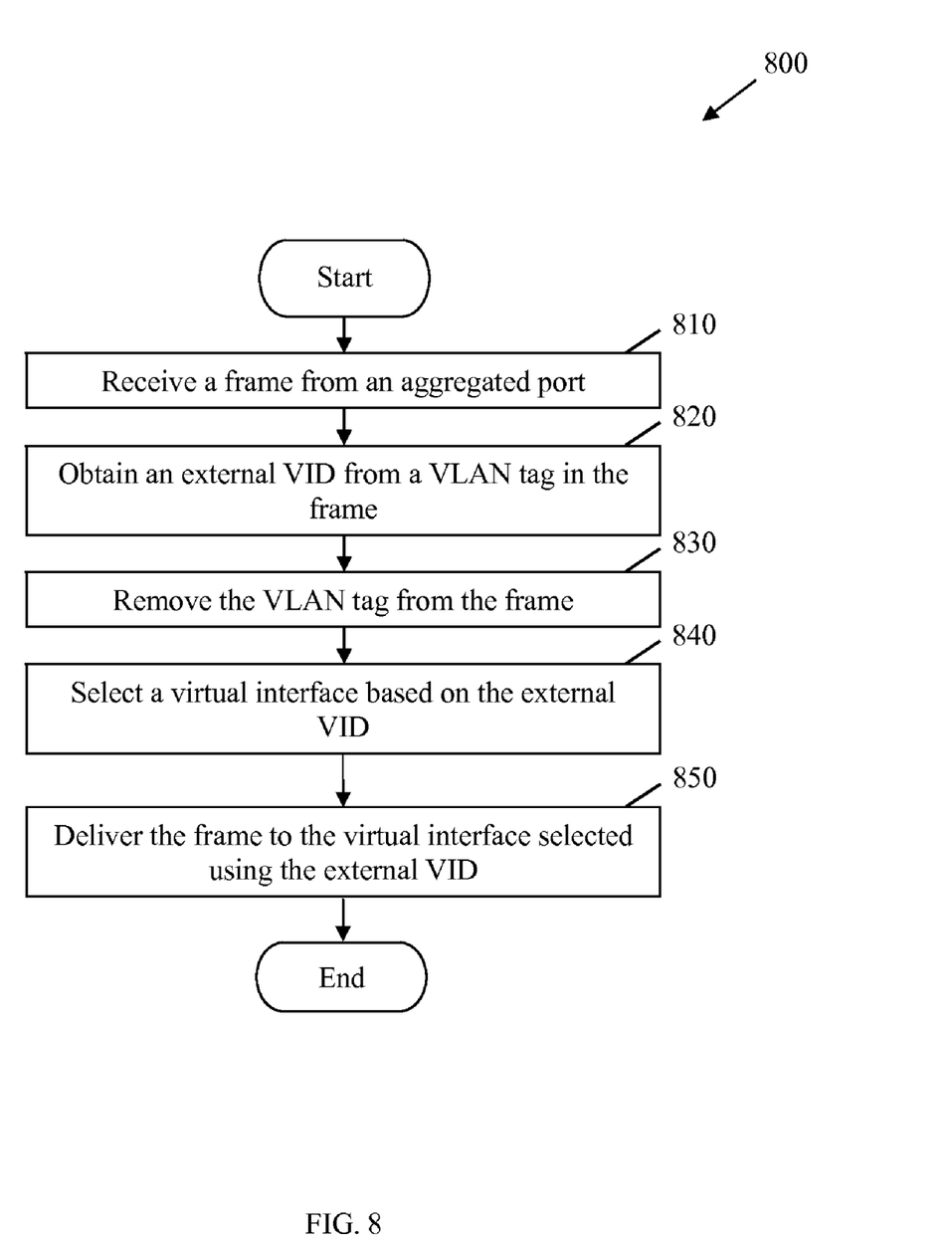
FIG. 8 is a flowchart of another embodiment of a VLAN blind transport multiplexing method for receiving a frame.

FIG. 8 illustrates an embodiment of a VLAN blind transport multiplexing method 800 for receiving a frame. The method 800 may be used to switch packets or frames in an end system, such as for the VMs 210 by the transport multiplexers 208 in the server 206. For instance, the method 800 may be implemented using the switch component 300, such as the transport multiplexer 208. The method 800 may begin at block 810, where a frame may be received from an aggregated port. For instance, the frame may be received from the aggregated port 304 in the switch component 300. At block 820, an external VID may be obtained from a VLAN tag in the frame.

At block 830, the VLAN tag may be removed from the frame. At block 840, a virtual interface may be selected based on the external VID. For instance, a frame or packet may be received at the aggregated port 304 and a VLAN tag comprising an external VID that identifies one of the leaf ports 302 may be extracted from the packet. At block 850, the frame may be delivered to the virtual interface selected using the external VID. The method 800 may then end. In an embodiment, the VMs may send and receive frames that comprise internal VID VLAN tags additional to the external VID VLAN tags. As such, the internal VID VLAN tags may be processed by the VMs instead of the transport multiplexers 208.

Figure 9:
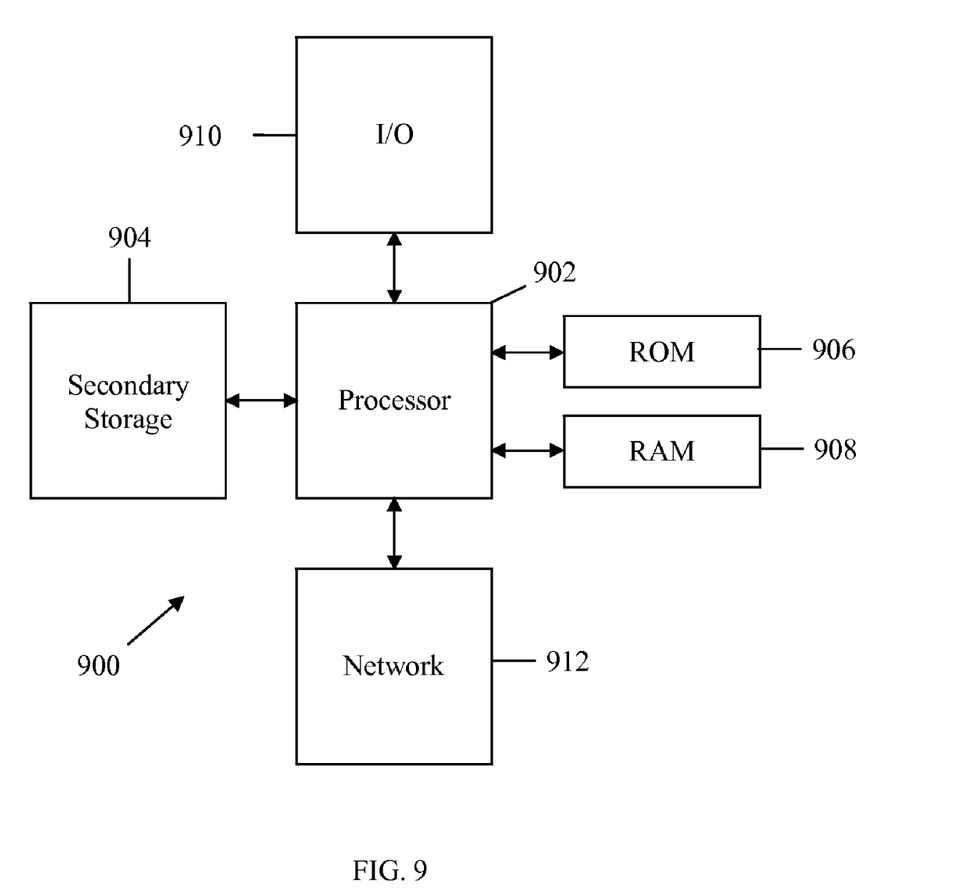
FIG. 9 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 9 illustrates a typical, general-purpose network component 900 suitable for implementing one or more embodiments of the components disclosed herein. The network component 900 includes a processor 902 (which may be referred to as a central processor unit or CPU) that is in communication with memory devices including secondary storage 904, read only memory (ROM) 906, random access memory (RAM) 908, input/output (I/O) devices 910, and network connectivity devices 912. The processor 902 may be implemented as one or more CPU chips, or may be part of one or more application specific integrated circuits (ASICs).

The secondary storage 904 is typically comprised of one or more disk drives or tape drives and is used for non-volatile storage of data and as an over-flow data storage device if RAM 908 is not large enough to hold all working data. Secondary storage 904 may be used to store programs that are loaded into RAM 908 when such programs are selected for execution. The ROM 906 is used to store instructions and perhaps data that are read during program execution. ROM 906 is a non-volatile memory device that typically has a small memory capacity relative to the larger memory capacity of secondary storage 904. The RAM 908 is used to store volatile data and perhaps to store instructions. Access to both ROM 906 and RAM 908 is typically faster than to secondary storage 904.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^* (R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network comprising:
   a switch configured to switch frame between a plurality of remote interfaces via a plurality of virtual interfaces associated with the remote interfaces, and wherein the frame comprises an external virtual local area network (VLAN) identifier (VID) associated with the remote interface to select one of the virtual interface;
   wherein the switch is in a first network domain and the remote interfaces are in a second network domain, and wherein the frame of the remote interfaces is not switched between those remote interfaces inside the second network domain;
   wherein the first network is a first provider bridged network (PBN), the second network is a second PBN, and the switch comprises a port-mapping service VLAN (S-VLAN) component and a provider bridging S-VLAN component; and
   wherein the switch adds a second external virtual local area network (VLAN) identifier (VID) to the frame, and sends the frame including the second external VID to the second network domain.

2. The network of claim 1, wherein switching frame via the virtual interfaces prevents sending multicast or broadcast frame to one of the remote interfaces that originated the frame.

3. The network of claim 1, wherein the switch supports a hairpin feature that allows receiving and sending frame on the same aggregated port but not the same virtual interface from the virtual interfaces.

4. The network of claim 1, wherein the virtual interfaces are remote customer service interfaces (RCSIs) each of which comprises a provider access port and a customer network port coupled via an internal LAN or a provider access port and a customer edge port coupled via an internal LAN.

5. The network of claim 1, wherein the virtual interfaces are configured to forward frame based on an internal VID that is assigned to the frame independent of the external VID.

6. A switch comprising:
a transport multiplexer configured to switch frame between a plurality of remote interfaces via a plurality of virtual interfaces associated with the remote interfaces, and wherein the frame comprises an external virtual local area network (VLAN) identifier (VID) associated with the remote interface to select one of the virtual interfaces;
wherein the transport multiplexer is part of a transport-multiplexer-aware bridge coupled to the remote interfaces, and wherein the remote interfaces are provided by a second transport multiplexer and coupled to a plurality of virtual machines (VMs); and
wherein a plurality of transport multiplexers and the transport-multiplexer-aware bridge provide a plurality of channels that connect pairs of virtual interfaces, wherein each channel corresponds to a first virtual interface coupled to a VM and a second virtual interface coupled to a bridge forwarding process.

7. The switch of claim 6, wherein the transport multiplexer comprises an aggregated port and a set of virtual interfaces, and wherein the aggregated port is logically separated into the virtual interfaces using the external VIDs.

8. A network component comprising:
at least one processor configured to implement a method comprising:
receiving a frame at a physical port from one of a plurality of remote interfaces, wherein the physical port is in a first network domain and the remote interfaces are in a second network domain;
obtaining an external virtual local area network (VLAN) identifier (VID) from a VLAN tag in the frame;
selecting a virtual interface based on the external VID; and
delivering the frame to the selected virtual interface;
adding a second external VID which identifies a second virtual interface to the frame;
sending, based on the second external VID, the frame back to a second remote interface associated with the second virtual interface in the second network domain; and
wherein each of the virtual interfaces in the physical port is associated with one of the remote interfaces and each of the remote interfaces is assigned one of the external VIDs distinct from each other.

9. The network component of claim 8, wherein the method further comprises:
obtaining the internal VID from a second VLAN tag in the frame; and
forwarding, based on a internal VID, the frame from the selected virtual interface to a second virtual interface.

10. The network component of claim 8, wherein the method further comprises:
obtaining the internal VID from a default VID for the virtual port; and
forwarding, based on a internal VID, the frame from the selected virtual interface to a second virtual interface.

11. The network component of claim 8, wherein the physical port comprises a plurality of virtual interfaces, wherein the physical port is a component of a bridge in a first network, and wherein the frame is received from a second network coupled to the first network.

12. The network component of claim 8, wherein the virtual interface is coupled to a virtual machine (VM) on a server.

13. A method comprising:
selecting a physical port comprising a plurality of virtual interfaces to send a frame;
adding to the frame a virtual local area network (VLAN) tag comprising an external VLAN identifier (VID) that is used for identifying, by the physical port, one of plurality of the virtual interfaces to transmit the frame; and
sending the frame on the physical port coupled to the virtual interface;
wherein the physical port is a component of a bridge in a first network, and wherein the frame is received from one of a plurality of remote interfaces in a second network coupled to the first network; and
wherein each of the virtual interfaces in the physical port is associated with one of the remote interfaces and each of the remote interfaces is assigned one of the external VIDs distinct from each other, so that the frame of the remote interfaces is not switched between those remote interfaces inside the second network domain.

14. The method of claim 13 further comprising:
adding to the frame a second VLAN tag comprising an internal VID associated with the frame and independent of the external VID.

15. The network component of claim 13, wherein the physical port is an aggregated port and the virtual interface is a virtual port coupled to the aggregated port in a transport multiplexer, and wherein the frame is received from a virtual machine (VM) coupled to the transport multiplexer.

16. The method of claim 13, further comprising:
adding to the frame a second VLAN tag comprising an internal VID associated with the frame and independent of the external VID; wherein the frame is forwarded, based on the internal VID, from the virtual interface to a second virtual interface in the physical port.

17. A network comprising:
a switch configured to switch frame between a plurality of remote interfaces via a plurality of virtual interfaces associated with the remote interfaces, and wherein the frame comprises an external virtual local area network (VLAN) identifier (VID) associated with the remote interface that originated the frame; identify, based on the external VID, one of the plurality of the virtual interfaces to transmit the frame;
wherein the switch is in a first network domain and the remote interfaces are in a second network domain; and
wherein each of the virtual interfaces is associated with one of the remote interfaces and each of the remote interfaces is assigned one of the external VIDs distinct from each other, so that the frame of the remote interfaces is not switched between those remote interfaces inside the second network domain.

18. The network of claim 17, wherein the virtual interface which is identified based on the external VID to transmit the frame is configured to forward, based on an internal VID, the frame to a second virtual interface in the first network domain, wherein the internal VID is assigned to the frame independent of the external VID.

19. The network of claim 17, wherein when the second virtual interface receives the frame from the identified virtual interface, a second external VID which identifies the second virtual interface is added to the frame, and then the frame is send back to remote interface associated with the second virtual interface in the second network domain.

20. A switch comprising:

a transport multiplexer configured to switch frame between a plurality of remote interfaces via a plurality of virtual interfaces associated with the remote interfaces, and wherein the frame comprises an external virtual local area network (VLAN) identifier (VID) associated with the remote interface that originated the frame; identify, based on the external VID, one of the plurality of the virtual interfaces to transmit the frame;

wherein the switch is in a first network domain and the remote interfaces are in a second network domain; and wherein each of the virtual interfaces is associated with one of the remote interfaces and each of the remote interfaces is assigned one of the external VIDs distinct from each other, so that the frame of the remote interfaces is not switched between those remote interfaces inside the second network domain.

* * * * *